April 15, 1941. W. E. SHAWL 2,238,509
TACKLE SWIVEL
Filed July 9, 1940
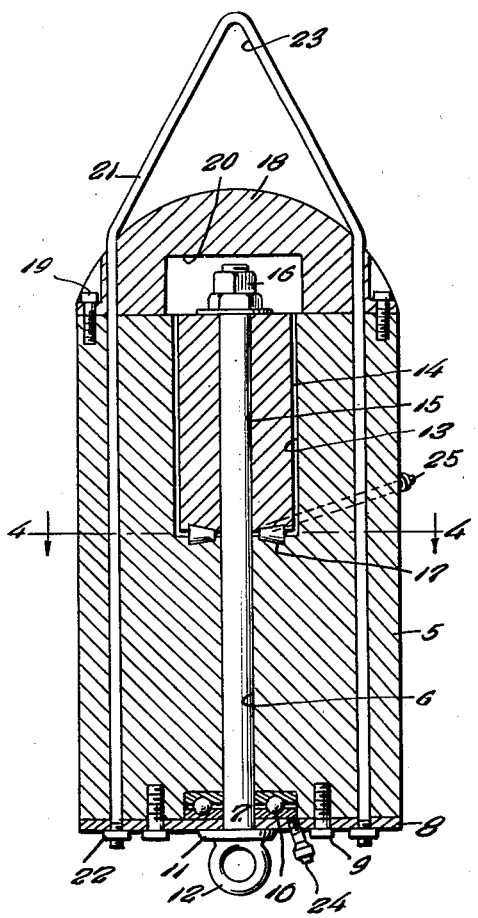
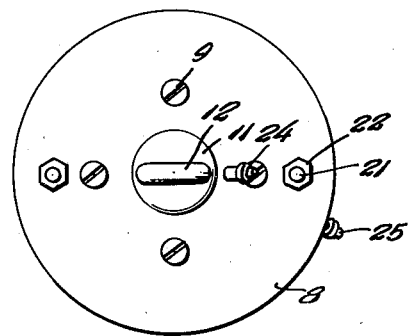
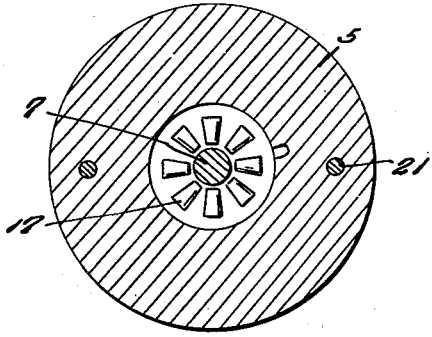
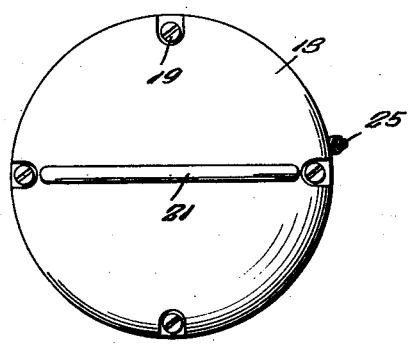
Inventor
WILLIAM ERNEST SHAWL
By *Clarence A. O'Brien*
Attorney Patented Apr. 15, 1941

2,238,509

UNITED STATES PATENT OFFICE 2,238,509

TACKLE SWIVEL

William Ernest Shawl, Olean, N. Y.

Application July 9, 1940, Serial No. 344,591

6 Claims. (Cl. 59—95)

The present invention relates to new and useful improvements in swivel connections for the line used with pulleys or blocks, and has for its primary object to prevent the twisting of the line when travelling over the sheaves of the block or pulleys, whereby to insure the free running of the line.

A further object is to provide a swivel connection of this character of a simple and practical construction, which is strong and durable, efficient and reliable in performance, relatively inexpensive to manufacture, and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout and in which—

Figure 1 is a longitudinal sectional view through a tackle swivel constructed strictly in accordance with the present invention.

Figure 2 is a top plan or end view.

Figure 3 is a bottom plan or end view, and

Figure 4 is a transverse sectional view taken substantially on the line 4—4 of Figure 1 looking in the direction of the arrows.

Referring now to the drawing in detail, wherein for the purpose of illustration I have disclosed a preferred embodiment of the invention, the numeral 5 designates a solid cylindrical body having a bore 6 extending longitudinally therethrough and within which is rotatably positioned a pin 7. One end of the body 5 is provided with a plate 8 secured in position to the body by means of screws 9 and surrounding the adjacent end of the pin 7 and countersunk in the body between the plate 8 and the body is a ball-bearing assembly 10.

The pin 7 projects outwardly of the plate 8 and is provided with a flange 11 abutting the outer surface of the plate, the end of the pin adjacent the flange being formed with a line-attaching eye 12.

At the other end of the body is a cylindrical recess 13, and positioned in said recess is a plug 14 adapted for free rotation and having a longitudinally extending bore 15 through which the pin 7 extends, the adjacent end of the pin having a nut 16 threaded thereon for securing the plug in position in the recess.

In the base of the recess is a set of roller bearings 17 engaged by the inner end of the plug 14 to facilitate free rotation of the plug and the pin.

The end of the body provided with the plug 14 is closed by a cap 18 secured in position by bolts 19, the cap having a chamber 20 formed therein to accommodate the nut 16 and the adjacent end of the pin.

A U-shaped bail 21 has its leg portions inserted longitudinally through the cap 18 and the body 5 with the end portions of the bail projecting through the plate 8 and having nuts 22 threaded thereon to secure the bail in position. The leg portions of the bail 21 outwardly of the cap 18 are bent in converging relation to limit inward movement of the bail and to provide a V-shaped loop 23 to which the line or pulley block may be attached.

A grease fitting 24 is inserted through the plate 8 for lubricating the ball-bearing assembly 10 and a similar fitting 25 is inserted through the side wall of the body 5 for lubricating the roller bearings 17.

From the foregoing it will be apparent that the pin 7 is adapted for free rotary movement in the body 5 and when the device is properly attached to the line of the tackle assembly a swivel connection is thus provided which prevents twisting of the line during use of the tackle.

It is believed the details of construction, advantages and manner of use of the device will be readily understood from the foregoing without further detailed explanation.

Having thus described the invention what I claim is:

1. A swivel comprising a body having a bore extending therethrough, a pin freely positioned in the bore and projecting outwardly at each end of the body, an eye at one end of the pin, a counterbore in the body at the opposite end of the pin, a plug freely mounted in the counterbore, means for securing said last-named end of the pin to the plug, a cap closing the end of the body and providing a cover for the plug and a bail having its end portions anchored to the body and arranged with its intermediate portion projecting outwardly of the cap to provide a line-attaching loop.

2. A swivel comprising a body having a bore extending therethrough, a pin freely positioned in the bore and projecting outwardly at each end of the body, an eye at one end of the pin, a counterbore in the body at the opposite end of the pin, a plug freely mounted in the counterbore, means for securing said last-named end of the pin to the plug, anti-friction means in the counterbore for the plug, a cap closing the end of the body and providing a cover for the plug and a bail having its end portions anchored to the body and arranged with its intermediate portion projecting outwardly of the cap to provide a line-attaching loop.

3. A swivel comprising a wooden body having a bore extending therethrough, a pin freely positioned in the bore and projecting outwardly at each end of the body, a metallic plate at one end of the body, an eye on the pin outwardly of the plate, a counterbore in the other end of the body, a plug secured to the adjacent end of the pin and rotatable in the counterbore, a cap on the body providing a cover for the plug, a U-shaped bail having its leg portions extending through the cap and also extending through the body and the plate, means for securing the ends of the bail to the plate and a line-attaching loop at the bight portion of the bail and disposed outwardly of the cap.

4. A swivel comprising a body having a bore extending therethrough, a pin freely rotatable in the bore and projecting outwardly at each end of the body, an eye at one end of the pin, means for securing the pin in the bore and a bail having its leg portions secured to the body and arranged with its intermediate portion projecting from the end of the body opposite to the eye to provide a line attaching loop.

5. In a line coupling and swivel structure of the class described, a body longitudinally bored, the opposite outer ends of the bore being counter-bored to accommodate an axle pin and bearing means therefor, a protective plate secured to one end of said body, and a wire bail centrally positioned and projecting beyond an adjacent end of said body, the limb portions of the bail being rigidly secured to said body.

6. A line anchoring and swivel coupling of the structure of the class described comprising a longitudinally bored body, the opposite end portions of the bore being counter-bored, a centrally apertured protective plate secured to one end of the body, bearing assemblies mounted in the counter-bores, an eye-bolt, the eye thereof being disposed outwardly of said plate, the shank passing through the aperture in the plate and said bore and counter-bores, said shank having operative association with the bearing assemblies to facilitate free rotation of said bolt, assembling means on the opposite inner end of the bolt for maintaining the latter and said bearing assemblies in operative relationship, and a bail having its bight portion projecting centrally beyond one end of said body, the limbs of said bail extending through the length of the body and through said plate and secured rigidly to the plate, the plate, eye-bolt, bearing assemblies and bail all being separably connected with each other to facilitate assembling, disassembling and replacement of parts.

WILLIAM ERNEST SHAWL.